(12) United States Patent
Cittadini et al.

(10) Patent No.: US 10,466,407 B2
(45) Date of Patent: Nov. 5, 2019

(54) COMBINATION DISPLAY INSTRUMENT

(71) Applicants: Ruddy Cittadini, Cologne (DE);
Andreas Deubzer, Cologne (DE);
Frederik Belzl, Cologne (DE); Yahia Hammiche, Argenteuil (FR); Pawel Murzyn, Chelmsford (GB)

(72) Inventors: Ruddy Cittadini, Cologne (DE);
Andreas Deubzer, Cologne (DE);
Frederik Belzl, Cologne (DE); Yahia Hammiche, Argenteuil (FR); Pawel Murzyn, Chelmsford (GB)

(73) Assignee: Visteon Global Technologies, INC., Van Buren Township, MI (US)

(*) Notice: Subject to any disclaimer, the term of this patent is extended or adjusted under 35 U.S.C. 154(b) by 171 days.

(21) Appl. No.: 15/388,659

(22) Filed: Dec. 22, 2016

(65) Prior Publication Data
US 2017/0176659 A1    Jun. 22, 2017

(51) Int. Cl.
*F21V 8/00* (2006.01)
*B60K 37/02* (2006.01)

(52) U.S. Cl.
CPC .............. *G02B 6/006* (2013.01); *B60K 37/02* (2013.01); *G02B 6/0055* (2013.01); *B60K 2350/1064* (2013.01); *B60K 2350/2034* (2013.01); *B60K 2350/2039* (2013.01); *B60Y 2400/92* (2013.01)

(58) Field of Classification Search
CPC .... B60K 2350/1064; B60K 2350/2034; B60K 2350/2039; B60K 37/02; B60Y 2400/92; G02B 6/0055; G02B 6/006
See application file for complete search history.

(56) References Cited

U.S. PATENT DOCUMENTS

| | | | | |
|---|---|---|---|---|
| 6,070,549 A | * | 6/2000 | Iuchi ...................... | G01D 11/28 116/287 |
| 2007/0201239 A1 | * | 8/2007 | Rosario .................. | G01D 11/28 362/489 |
| 2012/0002442 A1 | | 1/2012 | Brandt et al. | |

FOREIGN PATENT DOCUMENTS

| | | |
|---|---|---|
| DE | 10220335 A1 | 11/2003 |
| DE | 102009011948 A1 | 9/2010 |
| DE | 102010055077 A1 | 6/2012 |
| DE | 102013223244 A1 | 5/2015 |
| FR | 2839578 A1 | 11/2003 |
| WO | 2015071036 A1 | 5/2015 |

* cited by examiner

*Primary Examiner* — Omeed Alizada
(74) *Attorney, Agent, or Firm* — Quinn IP Law

(57) ABSTRACT

The disclosure relates to a combination indicating instrument, and has as its object to devise a hybrid combination display instrument for displaying information in a motor vehicle in a manner so as to provide a homogeneous and smooth transition between an analog display region and a digital display region within the hybrid combination display instrument. Also included for guiding the light generated by the light source, is a "light guiding device", which has a first surface facing away from the viewer (viewing individual), and a second surface facing toward the viewer.

9 Claims, 4 Drawing Sheets

COMBINATION DISPLAY INSTRUMENT

CROSS-REFERENCE TO RELATED APPLICATIONS

This application claims priority to German Nonprovisional Utility Patent Application No. 10 2016 124 173 3 filed Dec. 13, 2016, entitled "Combination Indicator" and German Provisional Patent Application No. 10 2015 122 534 4, filed Dec. 22, 2015, entitled "LIGHTGUIDE APPLIQUE OVER DISPLAY" which are herein incorporated by reference.

BACKGROUND

It is known to use analog display instruments with a pointer and a scale, with the measured value being indicated on the scale by means of the pointer, for example for an analog representation of the speed, the rotational speed, the engine temperature, or the fill level of the fuel storage tank. Such an analog display instrument may also be referred to as a pointing instrument or a pointer gauge.

A "scale" should be understood to comprise, e.g., a succession of a number of graduation marks on a display surface. The spacing of these graduation marks on the scale may be uniform or, if necessary, uneven. These graduation marks are used to read the currently displayed measured values, for example with the aid of a movable pointer. For this purpose, at least some of the graduation marks may be labeled with a respective value representing a physical quantity, such as a speed.

It is also known to digitally represent information by means of a suitable display for the representation of numbers, characters, and symbols. For example, numeric displays may be employed. In such displays, in addition, pictorial representations can also be provided, such as are typical, for example, when using a navigation system, a representation of the view of the surroundings, or a "back-up camera" for use in a system provided for driving in reverse.

Thus, a hybrid combination display instrument will be comprised of at least one analog display region and at least one digital display region, disposed next to each other. A combination display instrument can also be configured such that it has a digital display region in a central region, having a respective analog display region next to it laterally, in particular one analog display region on the left and one on the right.

In such a combination display instrument, a speed measurement value or a rotational speed measurement value can also be displayed, across the entire range of these values. The measured value is then displayed, for example, on a scale which is formed in part by the analog display region and in part by the digital display region.

Ordinarily, such hybrid combination display instruments are equipped with a complete "dial application", with a scale of the measured values to be displayed, which scale is disposed under a pointer. The "dial application", which may also be referred to as a "pointer dial", is at least partially disposed in the digital display region of a display provided for the display of digital information. However, the area of the (digital) display which can be used to display information is thereby reduced.

In addition, the dial display structure, which must be provided with means of illumination, is clearly distinguished from the surface of the rest of the display from the visual standpoint, by its overall height, so that the analog and digital display regions are notably "separated" from each other from the visual standpoint. For reasons of optical or design considerations, automotive manufacturers are desirous of having available solutions which offer an improved transition between the analog display region and the digital display region. This is particularly relevant in cases where the display of a measured value takes place on a scale which extends over the analog and digital display regions.

DE 10 2010 055 077 A1 discloses a display device for a motor vehicle having at least one layer which is light-transmitting over at least part of its extent and is capable of displaying numbers, scales, or the like. A light guiding means for illuminating the layer is disposed behind the layer, considered in the viewing direction. In addition, the light guiding means has an essentially flat structure, and has at least one lateral surface for admission (coupling) of light. A recess is provided in the light guiding means. The light guiding means is also provided with a reflective coating on its underside, and, on its upper side, with structures for external coupling.

The underlying problem of the invention of DE 10 2010 055 077 A1 was to devise a display device for a motor vehicle, the installation height (thickness) of which display device can be kept relatively small. In order to provide a proper display which has uniformly distributed illumination intensity, a light guiding means was proposed which has an upper side facing the viewer and a lower side facing away from the viewer, which (lower side) preferably extends in a conical shape from an outer diameter toward an inner diameter. The light guiding means is [thus] designed with a cross-section which tapers radially inward. In addition, the light guiding means is thickened on its periphery, for the purpose of improving the light coupling or the light distribution within the light guiding means. For purposes of the display function, a light-transmitting region with a scale and a pointer is disposed above the light guiding means.

The document DE 10 2013 223 244 A1 discloses a device for a vehicle for displaying at least one symbol, which has a light-transmitting plastic layer with an opaque coating. A "symbol surface" for displaying of a symbol is removed (cut out or omitted) from the opaque coating. The device has an opaque intermediate component which is applied on the opaque coating, outside of and surrounding the symbol surface, which intermediate component forms a light well adjoining the symbol surface. In addition, a diffuser element is provided which is disposed in the light well, and via a gap is disposed at a distance from the symbol surface, which diffuser element is designed to convert light incident on the diffuser element into a diffuse light for illuminating the symbol surface.

DE 102 20 335 A1 discloses a display device, in particular for a motor vehicle, with a display field which has an at least optoelectronic display means, in particular a liquid crystal display, in a surrounding field. The surrounding field is formed by a luminous surface element the light intensity and color location of which when in the luminous state corresponds at least to a large degree to the light intensity and color location of the display surface of the optoelectronic display means.

The luminous surface element is designed as a flat active light source or as a flat light-guiding plate, wherewith light from one or more light sources can be applied to the narrow side of said plate.

DE 10 2009 011 948 A1 describes a vehicle instrument panel with at least one liquid crystal display of the transparent-positive type, with its rear side being illuminated by daylight coming from the direction where the driver is located. The display has information areas and neutral areas, and is supported on a transparent holder over the information regions.

Such known combinations of an analog and a digital display region in a hybrid combination display instrument, from the prior art, are often produced with a complete pointer dial applied over the display, which reduces the useful area of the display. On the other hand, the number of plastic parts needed for the display, which parts are disposed, for example, above the surface of the display, does not allow a flat and homogeneous transition between the digital and the analog display regions of the scale.

SUMMARY

The disclosure relates to a combination display instrument in which a digital display region and an analog display region are disposed. The analog display region has at least one light source, which is connected to means for guiding (directing) the light generated by the light source into the analog display region.

Such a hybrid combination display instrument, which is provided, for example, for displaying information to a driver of a motor vehicle (or in other portions, referred to as a viewer), has both a first, analog display region, in which an analog presentation of the information is provided, and a second, digital display region, in which a digital presentation of the information is provided.

In such a combination display instrument, information about a vehicle speed, a rotational speed of the engine, a fill level of a fuel storage tank, an engine temperature, an available range, a current fuel consumption or energy consumption, an operating state or condition of the vehicle such as the status of the lighting system, or a transmission setting, and/or numerous other items of information, is typically provided.

Disclosed herein is a hybrid combination display instrument for displaying information in a motor vehicle, which instrument provides a homogenous and smooth transition between the analog display region and the digital display region, in the hybrid combination display instrument. The number of assemblies or elements needed for the hybrid combination indicating instrument is kept at a minimum reduced, in addition to the work of assembly, and the fabrication costs.

This problem is solved by an instrument having the features of the independent claims. Further refinements are set for in the dependent patent claims.

According to the present invention, a light guiding device is employed in the combination display instrument, which device may be formed from a light guiding material such as a PMMA (polymethyl methacrylate), which may also be referred to acrylic glass, or such as a thermoplastic material, e.g. a polycarbonate (PC).

A part of the technical solution consists in covering this light-guiding device or the light-guiding layer on its surfaces with a film or with a conventional type of coating, in order to avoid loss of light.

In order to enable good light distribution, the light guiding device must first be covered or coated with a white opaque layer, also referred to as a first coating, on the underside of the light guiding device. This lower white layer is designed such that it allows a good to very good reflection of the light introduced into the light guiding device and thus reduces the light losses from light exiting the light guiding device on the underside. A high-gloss white coating or a white reflective film may be used. The choice of a white color, which is not mandatory, provides the best possible result with regard to the desired reflections on the underside of the light guiding device, facing away from the driver of the vehicle.

It is additionally provided that the light guiding device is provided with an additional, second coating, on its upper side. The coating advantageously is of a white color, and is light-transmitting. A suitable coating of a customary type, or a film, can also be employed here. In addition to coating of the surface of the light guiding device which surface faces the driver, the lateral edges or side faces of the light guiding device can also be provided with this second coating.

After these processing steps, the light guiding device will be light-transmitting on its upper surface or upper side, and will be opaque on its lower surface or lower side.

In a subsequent step, after the second coating has been applied to the upper side of the light guiding device, a third coating can be applied over the second coating on the light guiding means. The color of the third coating will be, e.g., a color adapted to the rest of the combination display instrument, such as, e.g., black. The third coating may be comprised of an applied coating of the conventional type, or a printed film, in the appropriate color, and it is not light-transmitting.

Elements, such as numbers and/or characters and/or symbols, and/or a scale with a corresponding distribution of graduation marks, are introduced into the third coating. The elements which are introduced can be ascertained by the driver of a motor vehicle, since the light introduced into the light guiding device can exit the light guiding device at the locations of the said elements and the said scale.

For this purpose, it is also provided that the elements are introduced into the third coating by, e.g., laser etching. However, the means of introducing the elements are not limited to this method. Any method for partially removing the third coating which is suitable for producing the elements in a sufficiently high quality, such as selective etching, may be employed.

Alternatively, the third coating may also be applied by means of a printing process, wherewith the elements are produced by means of un-printed areas.

The light guiding device, and the display forming the digital display region, which display is disposed below the light guiding device, at least in some areas, are advantageously matched or adapted in terms of brightness, color representation, and representation of the "elements", such that a uniform overall impression is created, wherein the transition between the light guiding device, which represents (is responsible for) the analog display region, and the "display", which represents (is responsible for) the digital display region, is not perceived by the viewer (viewing individual) as being disturbing due to the use of the inventive light guiding device. Since the use of the inventive light guiding device allows one to dispense with a dial application, an appreciable reduction in the installation height (i.e. installation thickness) can be achieved.

BRIEF DESCRIPTION OF THE DRAWINGS

Additional details, features, and advantages, of forms and embodiments of the invention, will be apparent from the following description of exemplary embodiments, with reference to the accompanying drawings.

DETAILED DESCRIPTION

Figure 1:
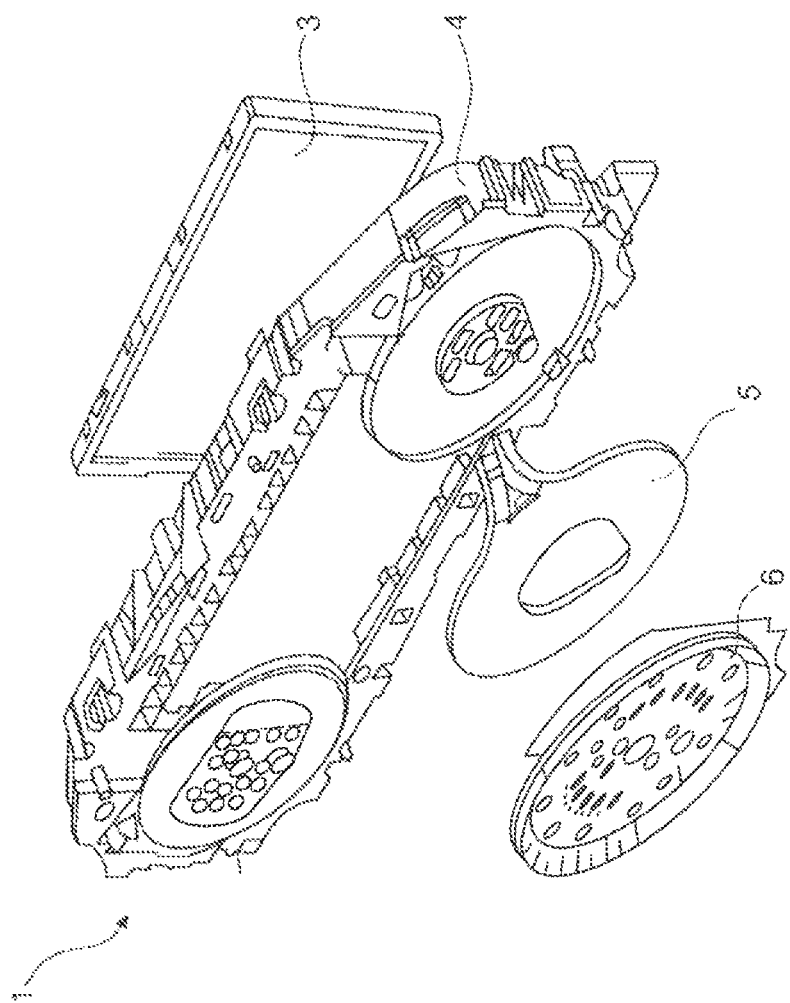
FIG. 1 illustrates assemblies within a combination display instrument according to a prior art embodiment.

In FIG. 1, the structure of a combination display instrument 1 according to the state of the art, with the essential components, is illustrated. A display 3 is disposed in a housing (not shown). By means of the display 3, digital contents or information are provided in a digital display region of the combination display instrument 1, such as, for example, information about the speed, range, or vehicle state or condition, as well as information about a navigation system or a view from a "back-up camera". Surrounding the display 3, a so-called light housing 4 is disposed which, for example, accommodates the light sources necessary for illuminating a scale, a pointer or other elements for displaying information for the driver of the vehicle, in the analog display region. The display 3 can be provided from the front or from the rear in the viewing direction of the driver, in the light housing 4.

In order to direct the light generated by a light source disposed in the light housing 4, for example to the region of a scale for representing a speed or a rotational speed, it is customary to dispose so-called "light guides" 5 on the light housing 4. These light guides 5 are designed such that a region or a part of the light guide 5 projects into the light housing 4. In this region or part, the light generated by the light source disposed in the light housing 4 is guided into the light guide 5. The light so introduced propagates in the light guide 5 and impinges on certain locations provided for this purpose, such as, for example, the surface, or an edge, or an engraving, indentation, etching, or similar element(s) introduced into the surface of the light guide 5.

A so-called "dial application" 6, which may also be referred to as a "pointer dial", is disposed in front of the light guide 5 in the viewing direction. The "dial application" 6, has, for example, recesses or openings in it which can be penetrated by the light emerging from the light guide 5 disposed behind it. It is thus possible, by means of suitable arrangement of the recesses, in particular regarding their disposition and size, for example, to provide a representation of a scale for a speed or rotational speed, or other parameters.

To display a measured value of the speed or a rotational speed, a "drive unit" is disposed, for example, in the light housing 4 or a part of the housing, which drives the pointer for indicating the speed or rotational speed, via a shaft. These elements are not shown in FIG. 1.

Optionally, it is possible to dispose a colored film in front of the display 3, for color adjustment or for selective darkening of the display 3. Such a film may also be referred to as a "black effect panel" (in English), and usually will have a black coloration.

Figure 2:
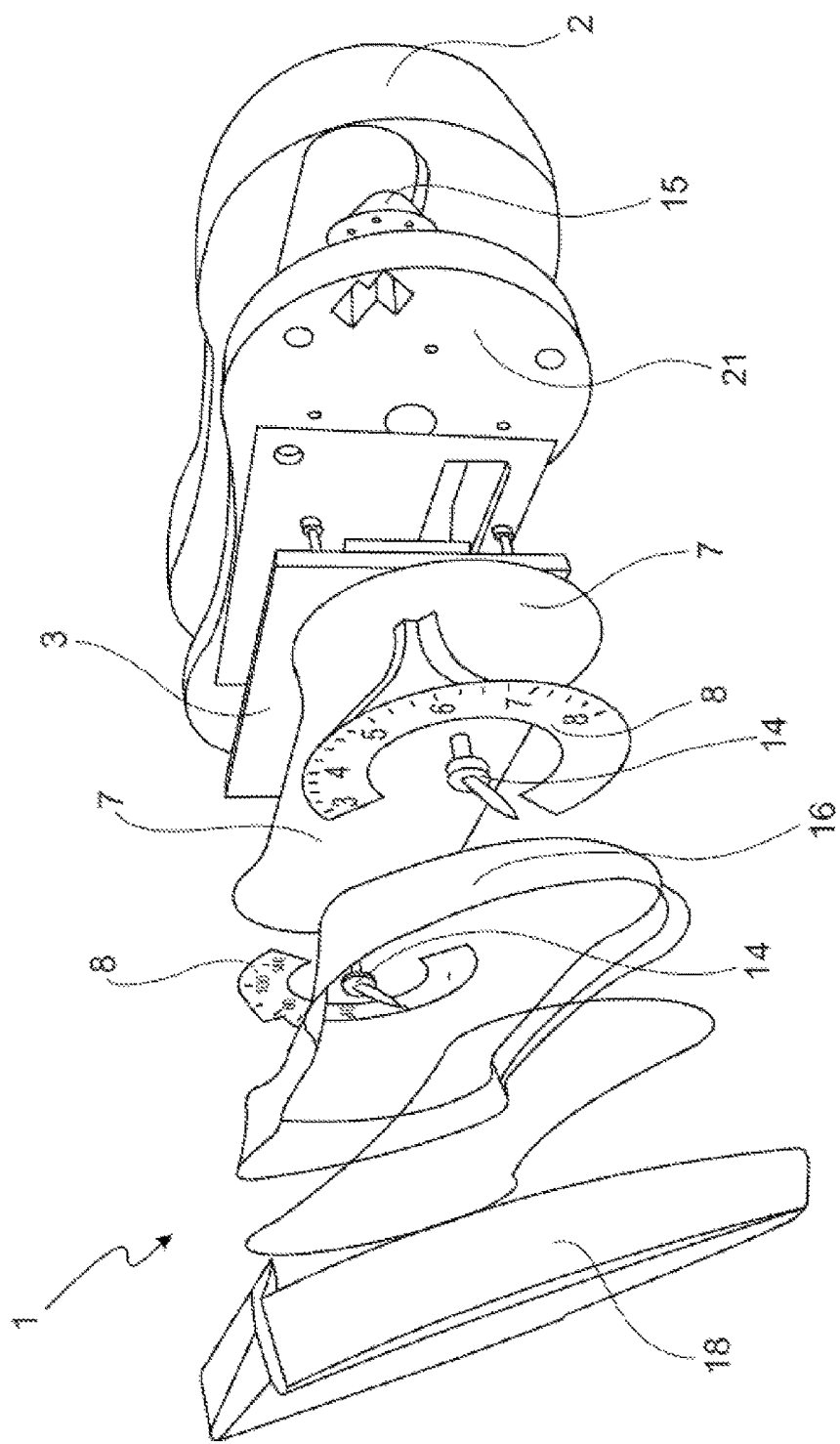
FIG. 2 is an illustration of a combination display instrument according to an embodiment disclosed herein.

FIG. 2 illustrates a combination display instrument 1 according to the invention. FIG. 2 shows a rear housing 2 which begins at the right, and a receiving arrangement 21 with a display 3 disposed in said receiving arrangement 21. Such a display 3 may be, e.g., a TFT display (thin-film transistor display (in English)), an LED (light-emitting diode display (in English)), an LCD (liquid crystal display (in English)), or an OLED (organic light-emitting diode display (in English)). It is customary to use displays which enable a color representation with a high to very high resolution, such as, for example, HD resolution (high definition (in English)), in the range of 1920×1080 pixels.

Optionally, a film 7 can be provided in front of the display 3, for selective darkening of the display 3. By means of such a film 7, the combination display instrument 1 can be adjusted to the design of the equipment of a vehicle. Thus, a display 3 in a switched-off state can have, for example, a black color. The film 7, which is disposed at least in front of the display 3 above a digital display region, can be designed such that it also extends over an analog display region of the combination display instrument 1. Thus, the combination display instrument 1 appears in a uniform design.

In front of the film 7 or the display 3, an inventive light guiding device 8 may be disposed, which will be described in more detail with reference to the part [(cross section)] illustrated in FIG. 3.

Two inventive light guiding devices 8 are disposed in two analog display regions, respectively on the left and right of the digital display region formed by the display 3. In order to display the actual measured values, in each instance a pointer 14 is provided, which is driven by means of a drive unit 15 disposed in the rear housing 2, via a shaft (not shown).

The combination display instrument 1 is completed by a frame 16, a viewing window 17, and a front housing part 18. In this case, the frame 16, for example, serves to provide the shape for the combination display instrument 1, and the viewing window 17 serves to provide mechanical protection for the combination display instrument 1 as well as protection against contamination. The front housing part 18 serves as the front member of the combination display instrument 1, forming, together with the rear housing 2, a structurally closed unit.

Figure 3:
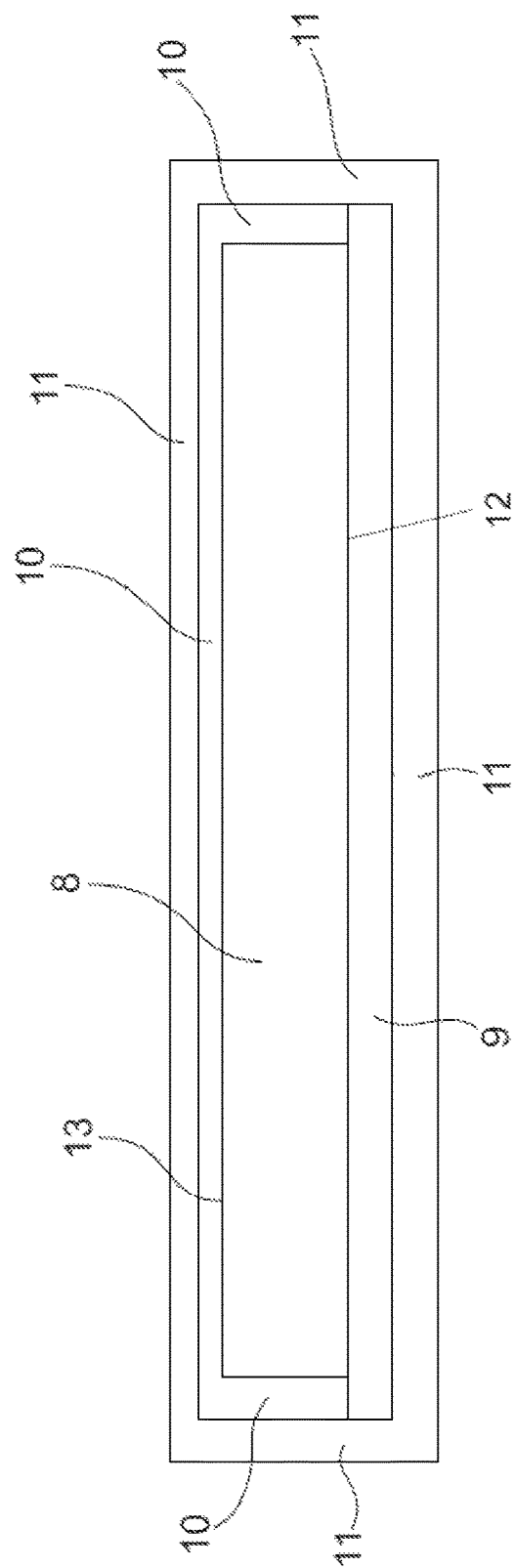
FIG. 3 is a light guiding device according to FIG. 2, in a cross sectional view.

FIG. 3 illustrates a cross sectional view of the inventive light guiding device 8 which was shown in FIG. 2 in the context of the overall apparatus. The light guiding device 8 is designed such that the light generated by a light source can be introduced into the light guiding device 8 at a suitable location, such as a lateral edge or surface. In order to avoid losses caused by light exiting the light guiding device 8, the light guiding device 8 is provided with a coating covering its surfaces. The coating is comprised of a first coating 9, which has high reflective properties as well as greatly reduced light permeability. Said first coating 9 is applied on the side of the light guiding device 8 facing away from the driver. The first coating 9, which is formed, for example, of a white coating of the conventional type or a film, serves to improve the reflection of the light guided by the light guiding device 8 on the underside (rear side) of the light guiding device 8, i.e. on the side of said light guiding device 8 facing away from the driver, which may also be referred to as the "first surface" 12 of the light guiding device 8.

Additionally, the light guiding device 8 is provided with a second coating 10. The second coating 10 is applied at least to the second surface 13 of the light guiding arrangement 8, which surface is opposite to the first surface 12 and thus faces the driver. Alternatively, the second coating 10 may also extend over the side edges or side faces of the light guiding device 8. In this embodiment, the light guiding device 8 is completely surrounded by the first coating 9 and the second coating 10, except for a location provided for light entry.

The second coating 10 has, e.g., a white color, and is light-transmitting. The second coating 10 may be in the form of a customary type of coating or a film, and is applied to the light guiding device 8 by a suitable method.

In addition, a third coating 11 is applied at least over the second surface 13, and over the second coating 10, which third coating 11 may have a dark color, and is opaque.

The third coating 11 forms a layer which is similar to a "black effect panel" (in English), which on the one hand prevents light from leaving the light guiding device 8, and on the other hand enables optical adaptation to the vehicle design.

The third coating 11 may also extend over the lateral edges of the light guiding device 8. In addition, the third coating 11 may also be applied on the first surface 12, over the first coating 9, wherewith it will completely surround the light guiding device 8.

For the display (representation) of elements such as numbers, characters, or symbols, the third coating 11 is at least partially, or completely, removed, e.g. by means of a suitable method, at the locations of the elements to be reproduced. This creates recesses in the form of the desired elements. A method of laser etching or the like, for example, may be used for this.

Thus, for example, a scale with a graduation and a legend comprised of numbers and/or characters can be generated on the inventive light guiding device 8. Thus, according to one example, a scale suitable for displaying a speed measurement value may be provided with a [display representing a] speed range of zero to 260 km per hour and the legend "km/hr".

Figure 4:
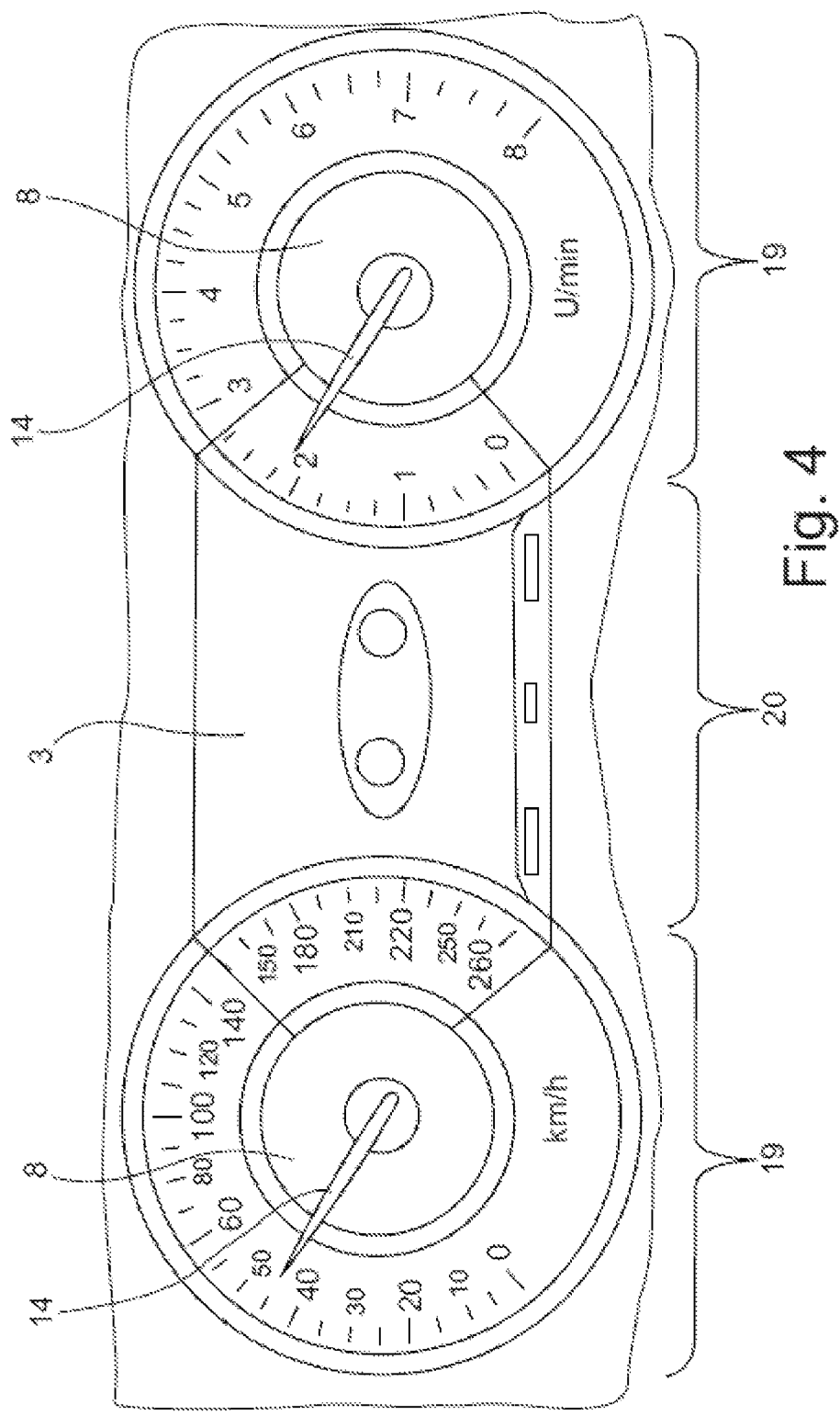
FIG. 4 is an illustration of a front-view of the combination display instrument.

FIG. 4 shows an exemplary embodiment of an inventive combination display instrument 1. The combination display instrument 1 is comprised of a digital display region 20 which is formed by a display 3 and is disposed in the center of the combination display instrument 1. In this area, digits, characters, symbols, or graphical representations are generated on the display 3. In this case, for example, information about the current speed, the range, a maintenance interval, problem messages, or warning messages, as well as information from various systems or assistance systems disposed in the vehicle, such as a distance warning system, an air conditioning system, or a navigation system, can be displayed in digital form.

The combination display instrument 1 also has two analog display regions 19, 19, which are disposed on the left and right, respectively of the digital display region 20. In the first analog display region 19, disposed on the left side, [the display of] a speed measuring device, which [display] may also referred to as a tachometer (in English), is shown. The tachometer displays the current measured value of the speed by means of a rotatably mounted pointer 14 and a drive unit 15 (not shown in FIG. 4). In the first analog display region 19, the inventive light guiding device 8 according to the invention is presented, with a scale provided for the range of speed from zero to 140 kilometers per hour. The light guiding device 8 also has a legend, "km/hr", which relates to the measured value which is (may be) displayed on the scale. The area of the scale in the speed range between 150 and 260 kilometers per hour is indicated by the display 3, i.e. in particular by the digital display region 20.

As a result of its novel structure, the inventive light guiding device 8 allows a very shallow installation thickness, e.g. a few millimeters; accordingly, it is possible to design the transition between the analog display region 19 and the digital display region 20 such that the transition is no longer perceived as disturbing or annoying by the driver.

The transition between the display regions 19, 20 appears to the driver to be in one plane. This flat configuration of the transition between the analog display region 19 and the digital display region 20 minimizes errors in reading the speed measurement value, which errors may also be referred to as parallax errors, in particular in the range above 150 kilometers per hour.

In the second analog display region 19, disposed on the right side of the combination display instrument 1, a tachometer for displaying the current rotational speed of the engine of the vehicle is shown. The display of the scale for the rotational speed also extends over both the digital display region 20 and the analog display region 19. The speed range between zero and 2800 revolutions per minute (rpm) is displayed in the digital display region 20, while the range of 3000 to 8000 rpm is displayed on the light guiding device 8. The light guiding device 8 also displays a legend "1/minute× 1000", which refers to the [units of measurement of the] value which can be represented in the scale, which can thus be in the range between zero and 8000 rpm.

In this instance as well, the transition between the display regions 19, 20 inside the scale is also flat, according to the invention, and is thus not perceived in an irregular, disturbed, or annoyed manner. Along with a corresponding design of the scale in the digital display region 20, in a color representation matched to the light guiding device 8, the scales are configured collectively as a unit with a seamless transition between the analog display region 19 and the digital display region 20.

Additional information is presented in the digital display region 20 of the display 3 (FIG. 4). In the left part of the display 3 in a region within the scale of the speed measuring device, a level indicator for a vehicle fuel storage tank is shown, by a bar display, which is shown adapted to the radius of the scale. For this purpose, the bar representing the fill level indicator extends in a circular path.

In the right part of the display 3, a display for representation of the current engine temperature is disposed, arranged in an area within the scale of the tachometer. This temperature display, too, in its representation, is for example adapted to the course of the scale of the tachometer, and accordingly extends in a circular path.

In the digital display region 20, additional information may be displayed, such as miles traveled, a clock, miles traveled on the given day, instructional messages, warning messages, or information about vehicle systems, or about a device connected to a vehicle system, such as a mobile telephone, or the like. It is also customary to adapt the representation in the digital display region 20 to the changing operating conditions of the vehicle or to the requirements of a particular driver.

The light guiding device 8 according to the invention may make it possible to reduce the number of required plastic parts for the combination display instrument 1, and also to reduce the cost and work of assembly during fabrication, since there is no need for a "dial application" ("pointer dial") 6 which has customarily been provided above the light guide 5 according to the prior art.

The light housing 4 of a combination display instrument 1 according to FIG. 1, which is known from the prior art, can be dispensed with, since a light source is disposed at least partially in or on the light guiding device 8 at a suitable location. For accommodating the display 3, the film 7, and the light guiding device 8, a receiving arrangement (receiving means) 21 may be provided, in which the said elements can be mechanically fixed.

The light guiding device 8 is preferably designed with a structural height (installation thickness) in the range of 2 to 3 millimeters. Since the light guiding device 8 must be arranged at least partially above the display 3 in a transition region between the analog display region 19 and the digital display region 20, the transition will be perceived as very uniform and not disturbing or annoying; this is namely due to the very small thickness, intrusiveness, and installation thickness of the light guiding device 8. The light guiding device 8 can be provided with a chamfered surface as a transition surface, at the edges in the transition regions, as a result of which the transition is more advantageously configured.

What is claimed is:

1. A combination display instrument, comprising:
    a digital display region and an analog display region, the analog display region having at least one light source with a light guiding device that guides light generated by the at least one light source within the analog display region;
    wherein the light guiding device has a first surface facing away from a viewer of the combination display instrument, a second surface facing the viewer, and a lateral surface for coupling of light and forming an edge of the light guiding device;
    a first light-reflecting and opaque coating is disposed on the first surface;
    a light-transmitting second coating is disposed on the second surface and the lateral surface; and
    an opaque third coating is disposed on the second coating, over the second surface and the lateral surface; and further in that the third coating has recesses in a form of elements.

2. The combination display instrument according to claim 1, wherein the first coating and the second coating are layers comprised of a coating material.

3. The combination display instrument according to claim 1, wherein the third coating is a coating material, a film layer, or a printed material.

4. The combination display instrument according to claim 1, wherein the elements are numbers, characters, symbols, or a scale divided into partial sectors or segments by graduation marks.

5. The combination display instrument according to claim 1, wherein the third coating is applied to and disposed on the lateral surfaces of the light guiding device, and on the first surface, over the first coating.

6. The combination display instrument according to claim 1, wherein a pointer instrument is disposed in the analog display region.

7. The combination display instrument according to claim 1, wherein a display is disposed in the digital display region.

8. The combination display instrument according to claim 7, wherein the display one of a TFT display, an LED display, an LCD display, or an OLED display.

9. A display instrument for a vehicle, the display instrument comprising:
    a digital display region and an analog display region;
    wherein the digital display region includes a display unit;
    wherein analog display region includes at least one light source with a light guiding device that guides light generated by the at least one light source within the analog display region;
    wherein the light guiding device has a first surface facing away from a viewer of the display instrument, a second surface facing the viewer, and an edge forming a lateral surface and operable to receive light from the at least one light source;
    a first coating adhered to the first surface of the light guiding device, wherein the first coating is an opaque light-reflecting coating;
    a second coating adhered to the second surface and the lateral surface of the light guiding device, wherein the second coating is a light-transmitting coating;
    a third coating adhered to the second coating on the second surface and the lateral surface of the light guiding device, wherein the third coating is an opaque coating including recesses forming elements in the third coating.

* * * * *